US012768935B2

(12) United States Patent
Zhang

(10) Patent No.: US 12,768,935 B2
(45) Date of Patent: Oct. 20, 2026

(54) TUNNEL POSITIONING METHOD, APPARATUS AND SYSTEM, AND STORAGE MEDIUM

(71) Applicant: ZTE CORPORATION, Shenzhen (CN)

(72) Inventor: Yujie Zhang, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 222 days.

(21) Appl. No.: 18/703,530

(22) PCT Filed: Jan. 17, 2023

(86) PCT No.: PCT/CN2023/072675
§ 371 (c)(1),
(2) Date: Apr. 22, 2024

(87) PCT Pub. No.: WO2023/236543
PCT Pub. Date: Dec. 14, 2023

(65) Prior Publication Data
US 2024/0426965 A1 Dec. 26, 2024

(30) Foreign Application Priority Data
Jun. 10, 2022 (CN) ......................... 202210657926.2

(51) Int. Cl.
*G01S 5/02* (2010.01)

(52) U.S. Cl.
CPC ................................ *G01S 5/02695* (2020.05)

(58) Field of Classification Search
CPC .. G01S 5/02695; G01S 2205/02; G01S 5/021; G01S 5/02213; G01S 5/14;
(Continued)

(56) References Cited

U.S. PATENT DOCUMENTS 6,082,193 A * 7/2000 Paulson .................. G01M 3/24
73/152.58
9,322,899 B2 4/2016 Christmann et al.
(Continued)

FOREIGN PATENT DOCUMENTS

CN 102111196 A 6/2011
CN 102879762 A 1/2013
(Continued)

OTHER PUBLICATIONS

International Search Report and Written Opinion in Corresponding International Application No. PCT/CN2023/072675, mailed Mar. 17, 2023; 12 pgs.
(Continued)

*Primary Examiner* — Bernarr E Gregory
(74) *Attorney, Agent, or Firm* — HAUPTMAN HAM, LLP

(57) ABSTRACT

Disclosed are a tunnel positioning method, apparatus and system and a storage medium. The method includes: acquiring first delay information corresponding to the first radio remote unit and second delay information corresponding to the second radio remote unit when a target device moves between a first radio remote unit and a second radio remote unit, the first radio remote unit and the second radio remote unit are any two adjacent radio remote units in a tunnel; and determining a position of the target device in the tunnel according to the first delay information, the second delay information, and a distance and a frame header delay difference between the first radio remote unit and the second radio remote unit acquired in advance.

8 Claims, 4 Drawing Sheets

(58) Field of Classification Search
CPC ........ G01S 15/34; G01S 11/06; G01S 5/0226; G01S 7/539; H01Q 13/203; H04W 88/085; H04W 64/00; H04B 17/27; H04B 17/309; H04B 17/318; Y02D 30/70; G01M 3/24; G01N 29/40
See application file for complete search history.

(56) References Cited

U.S. PATENT DOCUMENTS

| | | | | |
|---|---|---|---|---|
| 10,338,204 | B2 * | 7/2019 | Bevan | G01S 11/06 |
| 10,928,513 | B2 * | 2/2021 | Martin | G01S 15/34 |
| 2003/0033879 | A1 * | 2/2003 | Adewumi | G01N 29/40 73/627 |
| 2005/0035897 | A1 | 2/2005 | Perl et al. | |
| 2015/0114120 | A1 * | 4/2015 | Schroder | G01S 7/539 73/579 |
| 2018/0120412 | A1 * | 5/2018 | Kim | G01S 5/0226 |

FOREIGN PATENT DOCUMENTS

| | | |
|---|---|---|
| CN | 110988799 A | 4/2020 |
| CN | 113267798 A | 8/2021 |

OTHER PUBLICATIONS

Lu et al., "Location-aware ICI Reduction in MIMO-OFDM Downlinks for High-speed Railway Communication Systems", IEEE Transactions on Vehicular Technology, vol. 67 No. 4, dated Apr. 30, 2018; 16 pgs.
You et al., "Vehicles Positioning in Tunnel: A Real-Time Localization System Using DL-TDOA Technology", Journal of Internet Technology, vol. 22 No. 5, dated Dec. 31, 2021; 13 pgs.
3GPP TS, "Evolved Universal Terrestrial Radio Access Network", ETSI TS 136 305 V16.1.0, Jul. 1, 2020 (Jul. 1, 2020), XP093303723; 95 pgs.
Extended Search Report in Corresponding European Application No. 23818711.6, mailed Sep. 9, 2025; 14 pgs.
Ken-ichi Nishikawa et al., "A new position detection method using Leaky Coaxial Cable", IEICE Electronics Express, vol. 5, No. 8, Jan. 1, 2008 (Jan. 1, 2008), pp. 285-290, XP093303721; 5 pgs.
Mike Koivisto et al., "Joint Device Positioning and Clock Synchronization in 56 Ultra-Dense Networks", IEEE Transactions on Wireless Communications, vol. 16, No. 5, May 1, 2017 (May 1, 2017), pp. 2866-2881, XP093303722; 17 pgs.
Olga Blaszkiewicz et al., "Position Estimation in Corridors Along the Coupled Mode of Radiating Cables", MDPI, dated Sep. 6, 2020, XP093303720; 20 pgs.

* cited by examiner

TUNNEL POSITIONING METHOD, APPARATUS AND SYSTEM, AND STORAGE MEDIUM

CROSS-REFERENCES TO RELATED APPLICATIONS

The present application is a U.S. National Phase application of International Application No. PCT/CN2023/072675, filed on Jan. 17, 2023, which claims priority to Chinese Patent Application NO. 202210657926.2, filed on Jun. 10, 2022.

TECHNICAL FIELD

The present application relates to the technical field of wireless communication, and in particular to a tunnel positioning method, apparatus and system, and a storage medium.

BACKGROUND

With the rapid development of the transportation industry, tunnels are becoming more and more common in people's daily lives. Vehicles such as subways, high-speed rails, and trains often need to pass through tunnels during their travels. The communication base station system currently deployed in the tunnel can provide wireless communication signal coverage for the tunnel, but it cannot provide tunnel positioning function. Although Bluetooth® wireless technology systems and UltraWide Band (UWB) systems can be used in the existing technology to realize the positioning function of devices in the tunnels, the hardware cost of using this method is high and the construction is difficult. Therefore, how to provide a tunnel positioning method with lower hardware cost and less construction difficulty has become an urgent technical problem to be solved.

SUMMARY

The present application provides a tunnel positioning method, apparatus and system, and a storage medium to solve the problems in the related art that the hardware cost required to realize the tunnel positioning function is high and the construction is difficult.

In a first aspect, the present application provides a tunnel positioning method, which includes:

- acquiring first delay information corresponding to the first radio remote unit and second delay information corresponding to the second radio remote unit, in response to that a target device moves between a first radio remote unit and a second radio remote unit, the first radio remote unit and the second radio remote unit are any two adjacent radio remote units in a tunnel, the first delay information is configured to characterize a delay generated when a signal is transmitted from the target device to the first radio remote unit, and the second delay information is configured to characterize a delay generated when a signal is transmitted from the target device to the second radio remote unit; and
- determining a position of the target device in the tunnel according to the first delay information, the second delay information, and a distance and a frame header delay difference between the first radio remote unit and the second radio remote unit acquired in advance.

In a second aspect, the present application also provides a positioning apparatus for a device in a tunnel, and the positioning apparatus includes an acquisition module and a determination module. The acquisition module is configured to acquire first delay information corresponding to the first radio remote unit in response to that a target device moves between the first radio remote unit and the second radio remote unit, the first radio remote unit and the second radio remote unit are any two adjacent radio remote units in a tunnel, the first delay information is configured to characterize a delay generated when a signal is transmitted from the target device to the first radio remote unit, and the second delay information is configured to characterize a delay generated when a signal is transmitted from the target device to the second radio remote unit. The determination module is configured to determine a position of the target device in the tunnel according to the first delay information, the second delay information, and a distance and a frame header delay difference between the first radio remote unit and the second radio remote unit acquired in advance.

In a third aspect, the present application also provides a tunnel positioning system, including: a processor, a communication interface, a memory and a communication bus. The processor, the communication interface and the memory complete communication with each other through the communication bus, the memory is configured to store a computer program, and when the program stored in the memory is executed by the processor, steps of the tunnel positioning method of any embodiment described in the first aspect are implemented.

In a fourth aspect, the present application also provides a computer-readable storage medium, a computer program is stored on the computer-readable storage medium, and when the computer program is executed by a processor, steps of the tunnel positioning method of any embodiment described in the first aspect are implemented.

BRIEF DESCRIPTION OF THE DRAWINGS

The accompanying drawings, which are incorporated in and constitute a part of this specification, illustrate embodiments of the present application and serve to explain the principles of the present application together with the description.

In order to more clearly illustrate the technical solutions in the embodiments of the present application or in the related art, the accompanying drawings used in the embodiments or in the related art will be briefly described below. It will be apparent to those skilled in the art that other drawings can be acquired according to these drawings without creative efforts.

DETAILED DESCRIPTION OF THE EMBODIMENTS

In order to make the purpose, technical solutions and advantages of the present application clearer, the technical solutions in the present application will be clearly and completely described below in conjunction with the accompanying drawings of the present application. Obviously, the described embodiments are some rather than all of the embodiments of the present application. Based on the embodiments of the present application, all other embodiments acquired by those skilled in the art without creative efforts fall within the scope of the present application.

Figure 1:
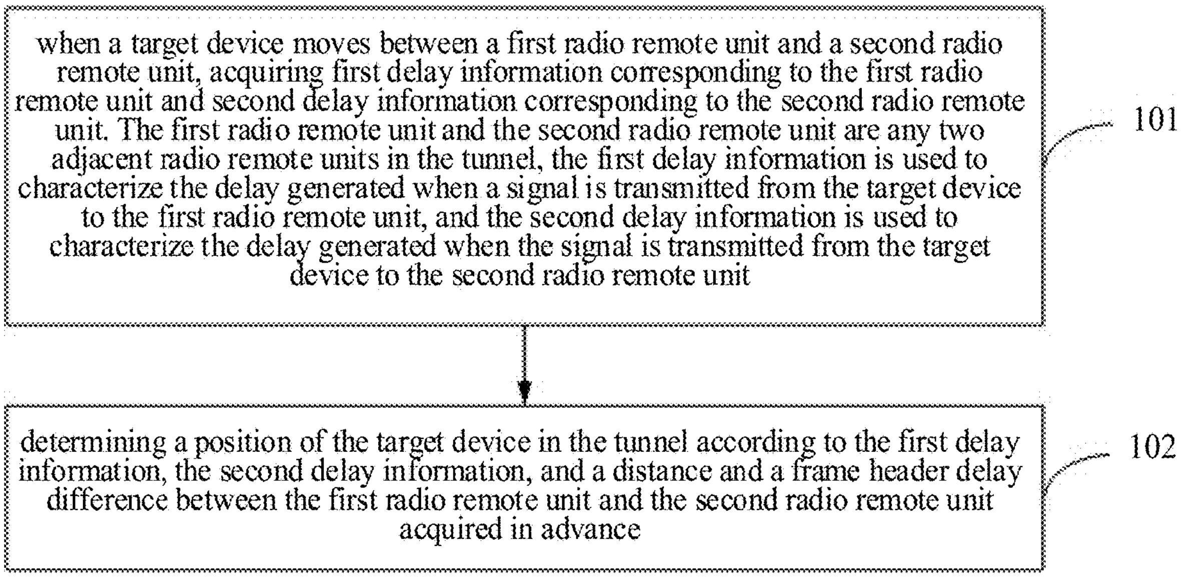
FIG. 1 is a schematic flow chart of a tunnel positioning method provided by the present application.

Referring to FIG. 1, which is a schematic flow chart of a tunnel positioning method provided by the present application. As shown in FIG. 1, the tunnel positioning method includes steps 101 to 102.

Step 101, when a target device moves between a first radio remote unit and a second radio remote unit, acquiring first delay information corresponding to the first radio remote unit and second delay information corresponding to the second radio remote unit. The first radio remote unit and the second radio remote unit are any two adjacent radio remote units in the tunnel, the first delay information is used to characterize the delay generated when a signal is transmitted from the target device to the first radio remote unit, and the second delay information is used to characterize the delay generated when the signal is transmitted from the target device to the second radio remote unit.

Figure 2:
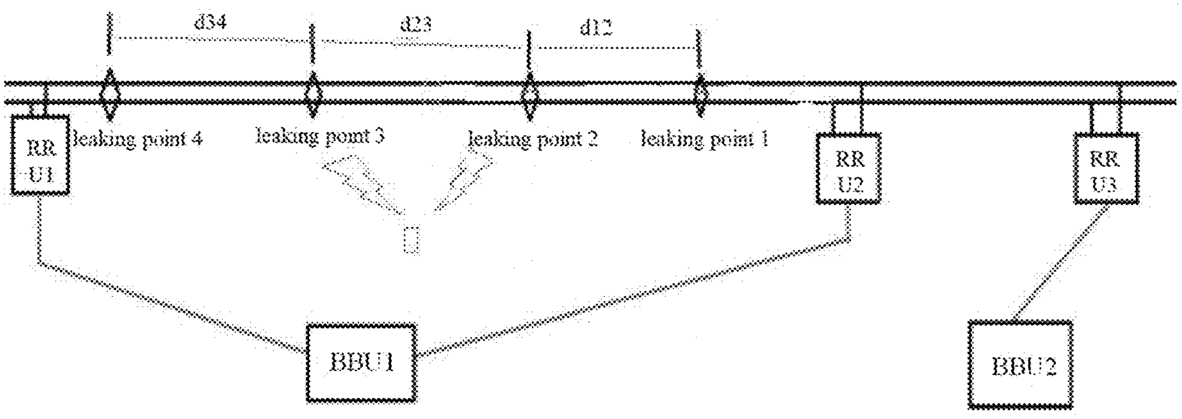
FIG. 2 is a schematic diagram of a tunnel positioning system provided by the present application.

It should be noted that this tunnel positioning method is applied to the tunnel positioning system shown in FIG. 2, which is implemented based on the communication base station system. In an embodiment, the tunnel positioning system includes multiple indoor distribution systems (Distributed Antenna System, referred to as DAS) connected in series. Each of DAS systems can include a baseband processing unit (Building Baseband Unit, referred to as BBU) and multiple radio remote units (RRU). The multiple RRUs are mounted at different positions on the leaky cable. There is at least one leaky cable port between any two adjacent RRUs, and the leaky cable port is used to transmit the signal in the leaky cable to the surrounding environment, or to receive the signal from the surrounding environment into the leaky cable to complete the communication function. In the present application, while the system completes the communication function, it additionally completes the tunnel positioning function.

In an embodiment, the first radio remote unit and the second radio remote unit are any two adjacent radio remote units among the multiple radio remote units in the tunnel positioning system. When the target device moves in the tunnel, it can be understood that the target device moves between the first radio remote unit and the second radio remote unit. Therefore, when the target device moves between the first radio remote unit and the second radio remote unit, the first delay information corresponding to the first radio remote unit and the second delay information corresponding to the second radio remote unit are acquired, that is, the delay generated when the signal is transmitted from the target device to the first radio remote unit and the delay when the signal is transmitted from the target device to the second radio remote unit are acquired.

Step 102, determining a position of the target device in the tunnel according to the first delay information, the second delay information, and a distance and a frame header delay difference between the first radio remote unit and the second radio remote unit acquired in advance.

In this step, after acquiring the first delay information and the second delay information, the distance and the frame header delay difference between the first radio remote unit and the second radio remote unit acquired in advance can be combined to calculate the position of the target device in the tunnel, so as to achieve the tunnel positioning function.

In this embodiment, the position of the target device in the tunnel can be determined according to the first delay information generated by the first radio remote unit and the second delay information generated by the second radio remote unit near the position of the target device, in order to achieve tunnel positioning function without deploying Bluetooth® and ultra wideband systems in the tunnel, thereby reducing the hardware cost and construction difficulty of tunnel positioning.

In an embodiment, the step 102 of determining the position of the target device in the tunnel according to the first delay information, the second delay information, and the distance and the frame header delay difference between the first radio remote unit and the second radio remote unit acquired in advance includes: calculating a first distance between the target device and the first radio remote unit and a second distance between the target device and the second radio remote unit respectively according to the first delay information, the second delay information, and the distance and the frame header delay difference between the first radio remote unit and the second radio remote unit acquired in advance; and determining the position of the target device in the tunnel according to the first distance and the second distance.

In an embodiment, after acquiring the first delay information and the second delay information, the distance and the frame header delay difference between the first radio remote unit and the second radio remote unit acquired in advance can be combined to calculate the first distance between the target device and the first radio remote unit and the second distance between the target device and the second radio remote unit, and the position of the target device in the tunnel is determined according to the first distance, the second distance, the position of the first radio remote unit and the position of the second radio remote unit to achieve the tunnel positioning function.

In an embodiment, the following formula can be used to calculate the first distance and the second distance:

$$\begin{cases} L_{1B} = \dfrac{L_{12} - \left(C_K * \left(TA_2^B - Dif_{21} - TA_1^B\right)\right)}{2} \\ L_{2B} = \dfrac{L_{12} + \left(C_K * \left(TA_2^B - Dif_{21} - TA_1^B\right)\right)}{2} \end{cases}$$

$L_{1B}$ represents the first distance, $L_{2B}$ represents the second distance, $L_{12}$ represents the distance between the first radio remote unit and the second radio remote unit, $C_K$ represents the transmission speed of light in the dielectric cable, $Dif_{21}$ represents the frame header delay difference between the first radio remote unit and the second radio remote unit, $$TA_1^B$$

represents the first delay information and $$TA_2^B$$

represents the second delay information.

In this embodiment, the transmission speed $C_K$ of light in the dielectric cable is generally relatively fixed and can be determined through experiments. The distance $L_{12}$ between the first radio remote unit and the second radio remote unit and the frame header delay difference $Dif_{21}$ between the first radio remote unit and the second radio remote unit can be acquired in advance through testing. In this way, the first distance between the target device and the first radio remote unit and the second distance between the target device and the second radio remote unit can be calculated according to the above formula, thereby determining the position of the target device.

In an embodiment, before the above step of calculating the first distance between the target device and the first radio remote unit and the second distance between the target device and the second radio remote unit respectively according to the first delay information, the second delay information, and the distance and the frame header delay difference between the first radio remote unit and the second radio remote unit acquired in advance, the method further includes: when the test device moves to the first position, third delay information corresponding to the first radio remote unit and fourth delay information corresponding to the second radio remote unit are acquired. The first position is located on a side of the first radio remote unit away from the second radio remote unit. The third delay information is used to characterize the delay generated when the signal is transmitted from the target device to the first radio remote unit, and the fourth delay information is used to characterize the delay generated when the signal is transmitted from the target device to the second radio remote unit. When the test device moves to the second position, fifth delay information corresponding to the first radio remote unit and sixth delay information corresponding to the second radio remote unit are acquired. The second position is located on the side of the second radio remote unit away from the first radio remote unit. The fifth delay information is used to characterize the delay generated when the signal is transmitted from the target device to the first radio remote unit, and the sixth delay information is used to characterize the delay generated when the signal is transmitted from the target device to the second radio remote unit. The distance and the frame header delay difference between the first radio remote unit and the second radio remote unit are calculated according to the third delay information, the fourth delay information, the fifth delay information and the sixth delay information.

Figure 3:
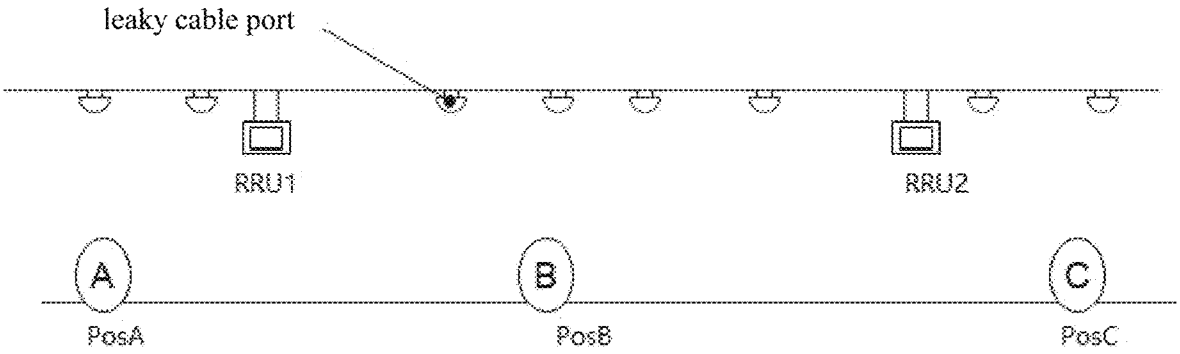
FIG. 3 is a partial structural schematic diagram of a tunnel positioning system provided by the present application.

In an embodiment, referring to FIG. 3, which is a partial structural schematic diagram of a tunnel positioning system. As shown in FIG. 3, RRU1 and RRU2 are two adjacent radio remote units in the tunnel positioning system. RRU1 can be used as the first radio remote unit, and RRU2 can be used as the second radio remote unit. Both RRU1 and RRU2 are hooked on the leaky cable. The position PosA is recorded as the first position, and the position PosC is recorded as the second position. Then, the test device sends a positioning signal at the position PosA, the delay of the positioning signal measured by RRU1 is recorded as the third delay information $$TA_1^A,$$

and the delay of the positioning signal measured by RRU2 is recorded as the fourth delay information $$TA_2^A.$$

The test device moves in the position PosC and sends the positioning signal, the delay of the positioning signal measured by RRU1 is recorded as the fifth delay information $$TA_1^C,$$

and the delay of the positioning signal measured by RRU2 is recorded as the sixth delay information $$TA_2^C.$$

When the test device sends the positioning signal at any position, the positioning signals connected from multiple leaky cable ports will reach the RRU. Therefore, RRU shows multiple paths in receiving signals. According to the fading characteristics, the delay value of the strongest path can be selected as the delay between the test device and RRU.

For the leaky cable port closest to the position PosA, the following expression can be acquired:

$$C_K*(TA_1^A-(TA_2^A-Dif_{21}))=L_{12}$$

For the leaky cable port closest to the position PosC, the following expression can be acquired:

$$C_K*((TA_2^C-Dif_{21})-TA_1^C)=L_{12}$$

Combining the above two expressions, we can get:

$$\begin{cases} L_{12}=\dfrac{C_K*(TA_1^A-TA_2^A+TA_2^C-TA_1^C)}{2} \\ Dif_{21}=\dfrac{(TA_1^A-TA_2^A-TA_2^C+TA_1^C)}{2} \end{cases}$$

$L_{12}$ represents the distance between the first remote radio unit and the second remote radio unit, $Dif_{21}$ represents the frame header delay difference between the first remote radio unit and the second remote radio unit, $$TA_1^A$$

represents the third delay information, $$TA_2^A$$

represents the fourth delay information, $$TA_1^C$$

represents the fifth delay information, $$TA_2^C$$

represents the sixth delay information, and $C_K$ represents the transmission speed of light in the media cable.

It should be noted that when there are multiple test devices, or the test device moves from the position PosA to the position PosC multiple times, multiple third delay information, multiple fourth delay information, multiple five delay information and multiple sixth delay information can be acquired. At this time, the validity of the multiple delay information acquired can be determined, such as using an alpha mean filtering function to remove invalid delay information, etc., to further enhance the effectiveness of common parameters and improve calculation accuracy.

In this embodiment, the distance and frame header delay difference between any two adjacent radio remote units in the tunnel positioning system can be acquired by using the above method. In this way, when subsequently positioning the position of the target device, the distance between the target position and the two radio remote units can be calculated according to the distance and the frame header delay difference between any two adjacent radio remote units in the tunnel positioning system to achieve tunnel positioning function.

In an embodiment, when the target device enters the middle area of RRU1 and RRU2 and performs linear motion, $$(TA_2^B - TA_1^B)$$

of the position PosB will change monotonically, and the following equation can be acquired:

$$\begin{cases} L_{1B} + L_{2B} = L_{12} \\ L_{2B} - L_{1B} = C_K * (TA_2^B - Dif_{21} - TA_1^B) \end{cases}$$

From this, we can solve the equation to get:

$$\begin{cases} L_{1B} = \dfrac{L_{12} - (C_K * (TA_2^B - Dif_{21} - TA_1^B))}{2} \\ L_{2B} = \dfrac{L_{12} + (C_K * (TA_2^B - Dif_{21} - TA_1^B))}{2} \end{cases}$$

After acquiring the first distance between the target device and the first remote radio unit and the second distance between the target device and the second remote radio unit, the position of the target device in the tunnel can be determined according to the first distance and the second distance. In an embodiment, the following expression can be used to determine the position of the target device:

$$\begin{cases} X_{PosB} = X_{RRU1} + \dfrac{L_{1B} * (X_{RRU2} - X_{RRU1})}{L_{12}} \\ Y_{PosB} = Y_{RRU1} + \dfrac{L_{1B} * (Y_{RRU2} - Y_{RRU1})}{L_{12}} \end{cases}$$

$X_{PosB}$ represents the abscissa of the target device in a preset coordinate system, $Y_{PosB}$ represents the ordinate of the target device in the preset coordinate system, $X_{RRU1}$ represents the abscissa of the first radio remote unit in the preset coordinate system, $Y_{RRU1}$ represents the ordinate of the first radio remote unit in the preset coordinate system, $X_{RRU2}$ represents the abscissa of the second radio remote unit in the preset coordinate system, $Y_{RRU2}$ represents the ordinate of the second radio remote unit in the preset coordinate system, $L_{12}$ represents the distance between the first radio remote unit and the second radio remote unit, $L_{1B}$ represents the first distance, and $L_{21}$ represents the second distance.

It should be noted that the abscissa $X_{RRU1}$ and ordinate $Y_{RRU1}$ of the first radio remote unit in the preset coordinate system, and the abscissa $X_{RRU2}$ and ordinate $Y_{RRU2}$ of the second radio remote unit in the preset coordinate system can be measured. Therefore, on the basis that the first distance $L_{1B}$ and the second distance $L_{21}$ are known, the abscissa and ordinate of the target device in the preset coordinate system can be calculated based on the above expression, that is, the position of the target device. When $$(TA_2^B - TA_1^B)$$

changes over time, the target device is in the position PosB. By observing the direction of the slope of the change, the direction of movement can be determined. When $$(TA_2^B - TA_1^B)$$

is stable, combined with the previous movement direction, it can be determined whether the current position is the position PosA or position PosC.

In an embodiment, the above step 101, acquiring the first delay information corresponding to the first radio remote unit and the second delay information corresponding to the second radio remote unit, includes: acquiring the positioning signal sent by the target device at the same time received by the first radio remote unit and the second radio remote unit. At least one cable leakage port is provided between the first radio remote unit and the second radio remote unit, the delays of the positioning signal from different leaky cable ports to the first radio remote unit are different, and the delays of the positioning signal from different leaky cable ports to the second radio remote unit are different. According to the signal strength of the positioning signal, the delay corresponding to the positioning signal with the highest signal strength received by the first radio remote unit is selected as the first delay information, and the delay corresponding to the positioning signal with the highest signal strength received by the second radio remote unit is selected as the second delay information.

In an embodiment, since the propagation loss of the positioning signal in the leaky cable is significantly lower than that in the air, the positioning signal of the target device will enter the leaky cable at the closest leaky cable port, and the signal received by the other leaky cable ports will gradually attenuate due to exposure in the air. In this way, according to the maximum signal strength of the positioning signal received by the radio remote unit, the leaky cable port closest to the target device can be determined, thereby deriving the coordinates of the target device.

Continuing to refer to FIG. 3, when the target device is at the position PosB, it can send the positioning signal at the position PosB. Since the target device sends the positioning signal at the position PosB, the signals from multiple leaky cable ports will reach RRU1 and RRU2, RRU1 and RRU2 will show multiple paths in receiving the positioning signals. According to the fading characteristics, the delay corresponding to the positioning signal of the strongest path (that is, the maximum signal strength) received by RRU1 is used as the first delay information $$TA_1^B$$

between the target device and RRU1, and the delay corresponding to the positioning signal of the strongest path that is, the maximum signal strength) received by RRU2 is used as the second delay information $$TA_2^B$$

between target device and RRU2

In this embodiment, the above method can be used to acquire the delay information between the target device and any two adjacent radio remote units in the tunnel positioning system to calculate the position of the target device according to the delay information, thereby realizing the tunnel positioning function.

The present application provides a method for tunnel positioning using a communication base station system, which mainly uses the delay information of the positioning signals sent by the target devices received by different RRUs to estimate the position and speed of the target device. When the target device moves on the coverage tunnel of multiple RRUs, the delay changes of the positioning signal received by different RRUs from the target device will reflect the position of the target device and the position relationship of each RRU. By using these position relationships and comparing the delay information, the position of the target device can be further locked, thereby achieving the positioning effect. The present application can realize the positioning and tracking of vehicles and people's mobile phones in the tunnel, with an expected accuracy of about 10 meters, and can provide warning when a vehicle or people's mobile phone is found to stay at a certain position for a long time.

Figure 4:
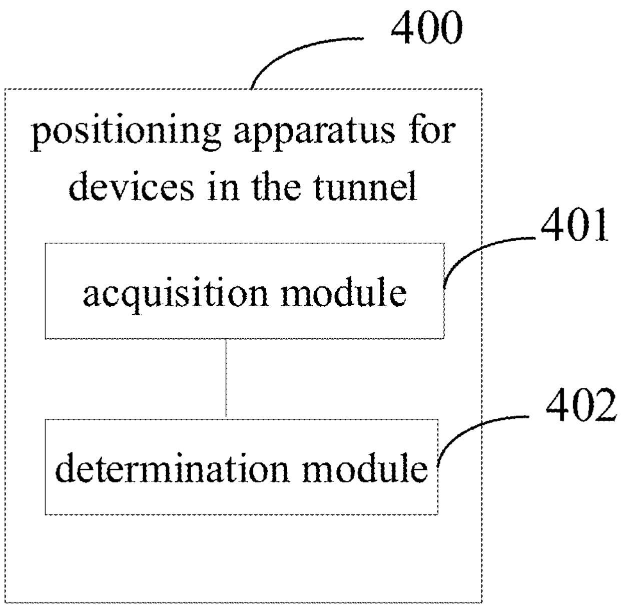
FIG. 4 is a schematic structural diagram of a positioning apparatus for devices in a tunnel provided by the present application.

In addition, the present application also provides a positioning apparatus for devices in the tunnel. Referring to FIG. 4, FIG. 4 is a schematic structural diagram of a positioning apparatus for devices in the tunnel provided by the present application. As shown in FIG. 4, the positioning device for the apparatus in the tunnel includes an acquisition module and a determination module. The acquisition module is configured to acquire the first delay information corresponding to the first radio remote unit and the second delay information corresponding to the second radio remote unit when the target device moves between the first radio remote unit and the second radio remote unit. The first radio remote unit and the second radio remote unit are any two adjacent radio remote units in the tunnel, the first delay information is used to characterize the delay generated when the signal is transmitted from the target device to the first radio remote unit, and the second delay information is used to characterize the delay generated when the signal is transmitted from the target device to the second radio remote unit. The determination module is configured to determine the position of the target device in the tunnel according to the first delay information, the second delay information, and the distance and the frame header delay difference between the first radio remote unit and the second radio remote unit acquired in advance.

In an embodiment, the determination module includes: a first calculation sub-module configured to respectively calculate the first distance between the target device and the first radio remote unit and the second distance between the target device and the second radio remote unit according to the first delay information, the second delay information, and the distance and the frame header delay difference between the first radio remote unit and the second radio remote unit acquired in advance; and a determination sub-module configured to determine the position of the target device in the tunnel according to the first distance and the second distance.

In an embodiment, the first distance and the second distance are calculated using the following expressions:

$$\begin{cases} L_{1B} = \dfrac{L_{12} - \left(C_K * \left(TA_2^B - Dif_{21} - TA_1^B\right)\right)}{2} \\ L_{2B} = \dfrac{L_{12} + \left(C_K * \left(TA_2^B - Dif_{21} - TA_1^B\right)\right)}{2} \end{cases}$$

$L_{1B}$ represents the first distance, $L_{2B}$ represents the second distance, $L_{12}$ represents the distance between the first radio remote unit and the second radio remote unit, $C_K$ represents the transmission speed of light in the dielectric cable, $Dif_{21}$ represents the frame header delay difference between the first radio remote unit and the second radio remote unit, $$TA_1^B$$

represents the first delay information, and $$TA_2^B$$

represents the second delay information.

In an embodiment, the determination module further includes a first acquisition sub-module, a second acquisition sub-module and a second calculation sub-module.

The first acquisition sub-module is configured to acquire the third delay information corresponding to the first radio remote unit and the fourth delay information corresponding to the second radio remote unit when the test device moves to the first position. The first position is located on the side of the first radio remote unit away from the second radio remote unit, the third delay information is used to characterize the delay generated when the signal is transmitted from the target device to the first radio remote unit, the fourth delay information is used to characterize the delay generated when the signal is transmitted from the target device to the second radio remote unit.

The second acquisition sub-module is configured to acquire the fifth delay information corresponding to the first radio remote unit and the sixth delay information corresponding to the second radio remote unit when the test device moves to the second position. The second position is located on the side of the second radio remote unit away from the first radio remote unit, the fifth delay information is used to characterize the delay generated when the signal is transmitted from the target device to the first radio remote unit, and the sixth delay information is used to characterize the delay generated when the signal is transmitted from the target device to the second radio remote unit.

The second calculation sub-module is configured to calculate the distance and frame header delay difference between the first radio remote unit and the second radio remote unit according to the third delay information, the fourth delay information, the fifth delay information and the sixth delay information.

In an embodiment, the distance and frame header delay difference between the first radio remote unit and the second radio remote unit are calculated using the following expression:

$$\begin{cases} L_{12} = \dfrac{C_K * \left(TA_1^A - TA_2^A + TA_2^C - TA_1^C\right)}{2} \\ Dif_{21} = \dfrac{\left(TA_1^A - TA_2^A - TA_2^C + TA_1^C\right)}{2} \end{cases}$$

$L_{12}$ represents the distance between the first radio remote unit and the second radio remote unit, $Dif_{21}$ represents the frame header delay difference between the first radio remote unit and the second radio remote unit, $$TA_1^A$$

represents the third delay information, $$TA_2^A$$

represents the fourth delay information, $$TA_1^C$$

represents the fifth delay information, $$TA_2^C$$

represents the sixth delay information, and $C_K$ represents the transmission speed of light in the DC-54, media cable.

In an embodiment, the following expression is used to determine the position of the target device:

$$\begin{cases} X_{PosB} = X_{RRU1} + \dfrac{L_{1B} * (X_{RRU2} - X_{RRU1})}{L_{12}} \\ Y_{PosB} = Y_{RRU1} + \dfrac{L_{1B} * (Y_{RRU2} - Y_{RRU1})}{L_{12}} \end{cases}$$

$X_{PosB}$ represents the abscissa of the target device in the preset coordinate system, $Y_{PosB}$ represents the ordinate of the target device in the preset coordinate system, $X_{RRU1}$ represents the abscissa of the first radio remote unit in the preset coordinate system, $Y_{RRU1}$ represents the ordinate of the first radio remote unit in the preset coordinate system, $X_{RRU2}$ represents the abscissa of the second radio remote unit in the preset coordinate system, $Y_{RRU2}$ represents the ordinate of the second radio remote unit in the preset coordinate system, $L_{12}$ represents the distance between the first radio remote unit and the second radio remote unit, $L_{1B}$ represents the first distance, and $L_{2B}$ represents the second distance.

In an embodiment, the acquisition module includes a third acquisition sub-module and a selection sub-module.

The third acquisition sub-module is configured to acquire the positioning signal sent by the target device at the same time and received by the first radio remote unit and the second radio remote unit. At least one leaky cable port is provided between the first radio remote unit and the second radio remote unit. The delays of the positioning signal from different leakage cable ports to the first radio remote unit are different, and the delays of the positioning signal from different leakage cable ports to the second radio remote unit are different.

The selection sub-module is configured to select, according to the signal strength of the positioning signal, the delay corresponding to the positioning signal with the highest signal strength received by the first radio remote unit as the first delay information, and select the delay corresponding to the positioning signal with the highest signal strength received by the second radio remote unit as the second delay information.

It should be noted that the positioning apparatus of devices in the tunnel can implement the steps of the tunnel positioning method provided in any embodiment of the method described above, and can achieve the same technical effect, which will not be repeated here.

Figure 5:
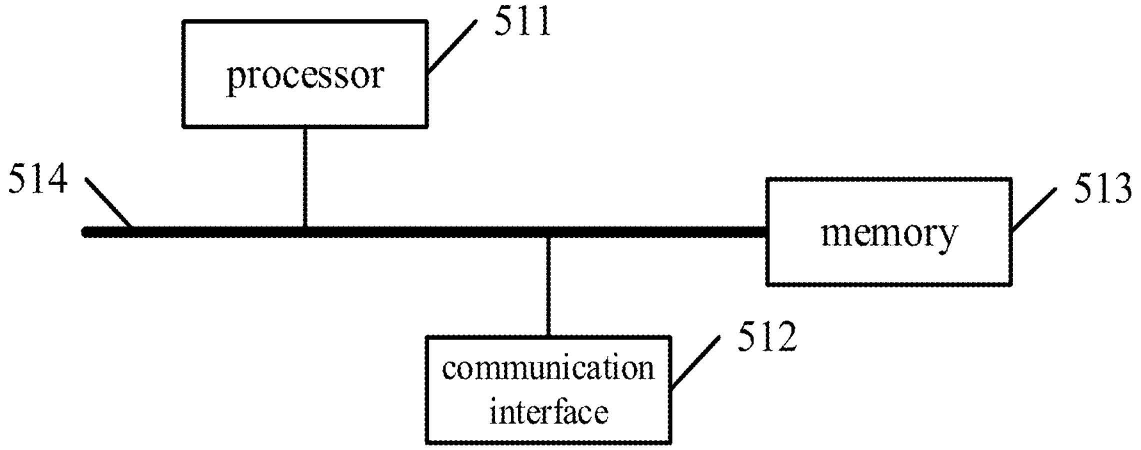
FIG. 5 is a schematic structural diagram of a tunnel positioning system provided by the present application.

As shown in FIG. 5, the present application provides a tunnel positioning system, which includes a processor 511, a communication interface 512, a memory 513 and a communication bus 514. The processor 511, the communication interface 512 and the memory 513 perform communication with each other through the communication bus 514, used to store computer programs.

In an embodiment of the present application, the processor 511 is used to implement the method provided in any embodiment of the method described above when executing the program stored on the memory 513, including: when the target device moves between the first radio remote unit and the second radio remote unit, acquiring the first delay information corresponding to the first radio remote unit and the second delay information corresponding to the second radio remote unit. The first radio remote unit and the second radio remote unit are any two adjacent radio remote units in the tunnel. The first delay information is used to characterize the delay generated when the signal is transmitted from the target device to the first radio remote unit, and the second delay information is used to characterize the delay generated when the signal is transmitted from the target device to the second radio remote unit. According to the first delay information, the second delay information, and the distance and frame header delay difference between the first radio remote unit and the second radio remote unit acquired in advance to determine the position of the target device in the tunnel.

The present application also provides a computer-readable storage medium on which a computer program is stored. When the computer program is executed by a processor, steps of the tunnel positioning method provided by any of the foregoing method embodiments are implemented.

In the present application, when the target device moves between the first radio remote unit and the second radio remote unit, the first delay information corresponding to the first radio remote unit and the second delay information corresponding to the second radio remote unit are acquired. The first radio remote unit and the second radio remote unit are any two adjacent radio remote units in the tunnel, the first delay information characterize the delay generated when the signal is transmitted from the target device to the first radio remote unit, and the second delay information characterize the delay generated when the signal is transmitted from the target device to the second radio remote unit. The position of the target device in the tunnel is determined according to the first delay information, the second delay information, and the distance and frame header delay difference between the first radio remote unit and the second radio remote unit acquired in advance. In this way, the position of the target device in the tunnel is determined according to the first delay information generated by the first radio remote unit and the second delay information generated by the second radio remote unit near the position of the target device, in order to achieve the tunnel positioning function, without deploying a Bluetooth© system and an ultra-wideband system in the tunnel, thus reducing the hardware cost and construction difficulty of tunnel positioning.

It should be noted that in this article, relational terms such as "first" and "second" are only used to distinguish one entity or operation from another entity or operation, and do not necessarily require or imply any actual relationship or order between these entities or operations. Furthermore, the terms "include", "comprise" or any other variants thereof are intended to cover a non-exclusive inclusion. Thus, a process, method, article or device that includes a series of elements not only includes those elements, but also includes other elements that are not expressly listed, or also includes elements inherent to the process, method, article or device. If there are no more restrictions, the element defined by the sentence "including a . . . " does not exclude the existence of other identical elements in the process, method, article or device that includes the element.

The above descriptions are only specific embodiments of the present application, enabling those skilled in the art to understand or implement the present application. Various modifications to these embodiments will be apparent to those skilled in the art, and the generic principles defined herein can be practiced in other embodiments without departing from the spirit or scope of the present application. Therefore, the present application is not limited to the embodiments shown herein, but is to be accorded the widest scope consistent with the principles and novel features claimed herein.

What is claimed is:

1. A tunnel positioning method, comprising:

acquiring first delay information corresponding to a first radio remote unit and second delay information corresponding to a second radio remote unit, in response to that a target device moves between a first radio remote unit and a second radio remote unit, wherein the first radio remote unit and the second radio remote unit are any two adjacent radio remote units in a tunnel, the first delay information is configured to characterize a delay generated when a signal is transmitted from the target device to the first radio remote unit, and the second delay information is configured to characterize a delay generated when a signal is transmitted from the target device to the second radio remote unit; and determining a position of the target device in the tunnel according to the first delay information, the second delay information, and a distance and a frame header delay difference between the first radio remote unit and the second radio remote unit acquired in advance, wherein acquiring the first delay information corresponding to the first radio remote unit and the second delay information corresponding to the second radio remote unit comprises:

acquiring a positioning signal sent from the target device at a same time and received by the first radio remote unit and the second radio remote unit, wherein at least one leaky cable port is provided between the first radio remote unit and the second radio remote unit, delays of the positioning signal from different leaky cable ports to the first radio remote unit are different, and delays of the positioning signal from different leaky cable ports to the second radio remote unit are different; and selecting a delay corresponding to a positioning signal with the highest signal strength received by the first radio remote unit as the first delay information, and selecting a delay corresponding to a positioning signal with the highest signal strength received by the second radio remote unit as the second delay information according to signal strength of the positioning signal.

2. The tunnel positioning method of claim 1, wherein determining the position of the target device in the tunnel according to the first delay information, the second delay information, and the distance and the frame header delay difference between the first radio remote unit and the second radio remote unit acquired in advance comprises:

respectively calculating a first distance between the target device and the first radio remote unit and a second distance between the target device and the second radio remote unit according to the first delay information, the second delay information, and the distance and frame header delay difference between the first radio remote unit and the second radio remote unit acquired in advance; and determining the position of the target device in the tunnel according to the first distance and the second distance.

3. The tunnel positioning method of claim 2, wherein the first distance and the second distance are calculated using the following formula:

$$\begin{cases} L_{1B} = \dfrac{L_{12} - \left(C_K * \left(TA_2^B - Dif_{21} - TA_1^B\right)\right)}{2} \\ L_{2B} = \dfrac{L_{12} + \left(C_K * \left(TA_2^B - Dif_{21} - TA_1^B\right)\right)}{2} \end{cases}$$

where L1B represents the first distance, L2B represents the second distance, L12 represents a distance between the first radio remote unit and the second radio remote unit, CK represents a transmission speed of light in a dielectric cable, Dif21 represents the frame header delay difference between the first radio remote unit and the second radio remote unit, $$TA_1^B$$

represents the first delay information, and $$TA_2^B$$

represents the second delay information.

4. The tunnel positioning method of claim 3, wherein the position of the target device is determined using the following formula:

$$\begin{cases} X_{PosB} = X_{RRU1} + \dfrac{L_{1B} * (X_{RRU2} - X_{RRU1})}{L_{12}} \\ Y_{PosB} = Y_{RRU1} + \dfrac{L_{1B} * (Y_{RRU2} - Y_{RRU1})}{L_{12}} \end{cases}$$

wherein XPosB represents a abscissa of the target device in a preset coordinate system, YPosB represents a ordinate of the target device in the preset coordinate system, XRRU1 represents a abscissa of the second radio remote unit in the preset coordinate system, YRRU1 represents a ordinate of the first radio remote unit in the preset coordinate system, XRRU2 represents a abscissa of the second radio remote unit in the preset coordinate system, YRRU2 represents a ordinate of the second radio remote unit in the preset coordinate system, L12 represents the distance between the first radio remote unit and the second radio remote unit, and L1B represents the first distance, and L2B represents the second distance.

5. The tunnel positioning method of claim 2, wherein before respectively calculating the first distance between the target device and the first radio remote unit and the second distance between the target device and the second radio remote unit according to the first delay information, the second delay information, and the distance and frame header delay difference between the first radio remote unit and the second radio remote unit acquired in advance, the method further comprises:

in response to that a test device moves to a first position, acquiring third delay information corresponding to the first radio remote unit and fourth delay information corresponding to the second radio remote unit, wherein the first position is located on a side of the first radio remote unit away from the second radio remote unit, the third delay information is configured to characterize a delay generated when a signal is transmitted from the target device to the first radio remote unit, and the fourth delay information is configured to characterize a delay generated when a signal is transmitted from the target device to the second radio remote unit;

in response to that the test device moves to the second position, acquiring fifth delay information corresponding to the first radio remote unit and sixth delay information corresponding to the second radio remote unit, wherein the second position is located on a side of the second radio remote unit away from the first radio remote unit, the fifth delay information is configured to characterize a delay generated when a signal is transmitted from the target device to the first radio remote unit, and the sixth delay information is configured to characterize a delay generated when a signal is transmitted from the target device to the second radio remote unit; and calculating the distance and frame header delay difference between the first radio remote unit and the second radio remote unit according to the third delay information, the fourth delay information, the fifth delay information and the sixth delay information.

6. The tunnel positioning method of claim 5, wherein the distance and the frame header delay difference between the first radio remote unit and the second radio remote unit are calculated using the following formula:

$$\begin{cases} L_{12} = \dfrac{C_K * \left(TA_1^A - TA_2^A + TA_2^C - TA_1^C\right)}{2} \\ Dif_{21} = \dfrac{\left(TA_1^A - TA_2^A - TA_2^C + TA_1^C\right)}{2} \end{cases}$$

wherein L12 represents the distance between the first radio remote unit and the second radio remote unit, Dif21 represents the frame header delay difference between the first radio remote unit and the second radio remote unit, $$TA_1^A$$

represents the third delay information, $$TA_2^A$$

represents the fourth delay information, $$TA_1^C$$

represents the fifth delay information, $$TA_2^C$$

represents the sixth delay information, and CK represents a transmission speed of light in a medium cable.

7. A tunnel positioning system, comprising:

a processor;

a communication interface;

a memory; and a communication bus, wherein the processor, the communication interface and the memory complete communication with each other through the communication bus, the memory is configured to store a computer program, and when the program stored in the memory is executed by the processor, steps of the tunnel positioning method of claim 1 are implemented.

8. A non-transitory computer-readable storage medium, wherein a computer program is stored on the non-transitory computer-readable storage medium, and when the computer program is executed by a processor, steps of the tunnel positioning method of claim 1 are implemented.

* * * * *